United States Patent
Jing et al.

(10) Patent No.: US 11,543,928 B2
(45) Date of Patent: Jan. 3, 2023

(54) METHOD FOR DISPLAYING INPUT METHOD INTERFACE OF IMPROVED ACCURACY OF INPUT, DEVICE, AND TERMINAL

(71) Applicant: GUANGDONG OPPO MOBILE TELECOMMUNICATIONS CORP., LTD., Guangdong (CN)

(72) Inventors: Lei Jing, Guangdong (CN); Fang Song, Guangdong (CN); Zhiyong Lin, Guangdong (CN); Peigen Liu, Guangdong (CN); Liangjing Fu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 209 days.

(21) Appl. No.: 17/018,883

(22) Filed: Sep. 11, 2020

(65) Prior Publication Data
US 2020/0409512 A1    Dec. 31, 2020

Related U.S. Application Data

(63) Continuation of application No. PCT/CN2019/076452, filed on Feb. 28, 2019.

(30) Foreign Application Priority Data

Mar. 12, 2018   (CN) .......................... 201810201015.2

(51) Int. Cl.
*G06F 3/0481* (2022.01)
*G06F 3/04845* (2022.01)
*G06F 3/04886* (2022.01)

(52) U.S. Cl.
CPC ........ *G06F 3/0481* (2013.01); *G06F 3/04845* (2013.01); *G06F 3/04886* (2013.01);
(Continued)

(58) Field of Classification Search
CPC .............. G06F 3/0481; G06F 3/04886; G06F 3/04845; G06F 2203/04803; G06F 2203/04804
See application file for complete search history.

(56) References Cited

U.S. PATENT DOCUMENTS 9,779,475 B2 * 10/2017 Park ...................... G06F 3/0481
2009/0167716 A1 * 7/2009 Wang .................. G06F 3/04886
345/173

(Continued)

FOREIGN PATENT DOCUMENTS

| CN | 104601767 | 5/2015 |
|----|-----------|--------|
| CN | 105027060 | 11/2015 |

(Continued)

OTHER PUBLICATIONS

SIPO, First Office Action for CN Application No. 201810201015.2, dated Apr. 30, 2019.
(Continued)

*Primary Examiner* — Ting Z Lee
(74) *Attorney, Agent, or Firm* — Hodgson Russ LLP

(57) ABSTRACT

The embodiments of the disclosure provide a method for displaying an input method interface, a device, a terminal and a storage medium, relating to the field of human-computer interaction technologies. The method includes: displaying a first user interface of a first application; displaying a first floating window on the first user interface, the first floating window being configured for displaying a second user interface of a second application; and displaying a second floating window on the first user interface when a (Continued)

text input operation signal from the second user interface is received, wherein the first floating window and the second floating window are displayed concurrently, and the second floating window is configured for displaying an input method interface.

20 Claims, 12 Drawing Sheets

(52) U.S. Cl.
CPC .............. *G06F 2203/04803* (2013.01); *G06F 2203/04804* (2013.01)

(56) References Cited

U.S. PATENT DOCUMENTS

| | | | |
|---|---|---|---|
| 2012/0117506 A1* | 5/2012 | Koch ................ | G06F 3/04886 345/173 |
| 2012/0206363 A1* | 8/2012 | Kyprianou .......... | G06F 3/04886 345/168 |
| 2012/0324384 A1* | 12/2012 | Cohen ..................... | G06F 9/451 715/765 |
| 2015/0302103 A1 | 10/2015 | Jeremias | |
| 2015/0378600 A1* | 12/2015 | Sloan .................... | G06F 3/0482 715/773 |
| 2016/0004388 A1* | 1/2016 | Lee .......................... | G09G 5/14 715/768 |
| 2016/0224352 A1 | 8/2016 | Bauchot et al. | |
| 2016/0370864 A1* | 12/2016 | Choi ..................... | G06F 3/0481 |

FOREIGN PATENT DOCUMENTS

| | | |
|---|---|---|
| CN | 106708411 A | 5/2017 |
| CN | 107092418 A | 8/2017 |
| CN | 107102806 | 8/2017 |
| CN | 107526492 | 12/2017 |
| CN | 107526494 | 12/2017 |
| CN | 107562361 A | 1/2018 |
| CN | 107613117 | 1/2018 |
| CN | 107704177 | 2/2018 |
| CN | 107728901 | 2/2018 |
| CN | 108491127 | 9/2018 |

OTHER PUBLICATIONS

SIPO, Second Office Action for CN Application No. 201810201015.2, dated Jul. 22, 2019.
SIPO, Third Office Action for CN Application No. 201810201015.2, dated Oct. 22, 2019.
SIPO, Notification to Grant Patent Right for Invention for CN Application No. 201810201015.2, dated Dec. 26, 2019.
WIPO, ISR for PCT/CN2019/076452, dated May 7, 2019.
IPO, Examination Report for IN Application No. 202017044230, dated Aug. 27, 2021.
European Patent Office, Search Report for EP Application No. 19767148.0, dated Mar. 23, 2021.

* cited by examiner

METHOD FOR DISPLAYING INPUT METHOD INTERFACE OF IMPROVED ACCURACY OF INPUT, DEVICE, AND TERMINAL

CROSS REFERENCE TO RELATED APPLICATION(S)

This application claims priority to Chinese Patent Application No. 201810201015.2, filed Mar. 12, 2018, the entire disclosure of which is hereby incorporated by reference herein.

TECHNICAL FIELD

The present disclosure relates to the field of human-computer interaction technologies, and more particularly, to a method for displaying an input method interface, a device, a terminal and a storage medium.

BACKGROUND

Input methods are indispensable applications in smartphones, which are convenient for users to quickly enter text information.

In the related art, when inputting text using the input method, a lower display portion of the screen is used to display an input method interface including a keyboard, and the user can input text by clicking or selecting corresponding key buttons on the keyboard.

SUMMARY

The present disclosure provides a method for displaying an input method interface, a device, a terminal, and a storage medium. The technical solutions are as follows.

In an aspect, a method for displaying an input method interface is provided. The method comprising:
displaying a first user interface of a first application;
displaying a first floating window on the first user interface, the first floating window being configured for displaying a second user interface of a second application; and
displaying a second floating window on the first user interface when a text input operation signal from the second user interface is received, wherein the first floating window and the second floating window are displayed concurrently, and the second floating window is configured for displaying an input method interface.

In another aspect, a device for displaying an input method interface is provided. The device comprises:
an interface display module, configured for displaying a first user interface of a first application;
a first window display module, configured for displaying a first floating window on the first user interface, the first floating window being configured for displaying a second user interface of a second application; and
a second window display module, configured for displaying a second floating window on the first user interface when a text input operation signal from the second user interface is received, wherein the first floating window and the second floating window are displayed concurrently, and the second floating window is configured for displaying an input method interface.

In still another aspect, a terminal is provided. The terminal comprises a processor and a memory; the memory stores at least one instruction, the at least one instruction is configured for being executed by the processor to implement the method as described above.

In still another aspect, a storage medium is provided. The storage medium stores at least one instruction, the at least one instruction is configured for being executed by the processor to implement the method as described above.

DETAILED DESCRIPTION OF PREFERRED EMBODIMENTS

In order to make the purposes, technical solutions and advantages of this disclosure clearer, the embodiments of the disclosure will be further described in detail below with reference to the accompanying drawings.

As used herein, "a plurality" refers to two or more. The expression "and/or" describes the relationship between related objects and indicates that there maybe three kinds of relationships. For example, A and/or B can indicate that there are three cases in which just A exists, A and B coexist, and just B exists. The character "/" generally indicates that the related objects are in the relationship of "or".

Figure 1:
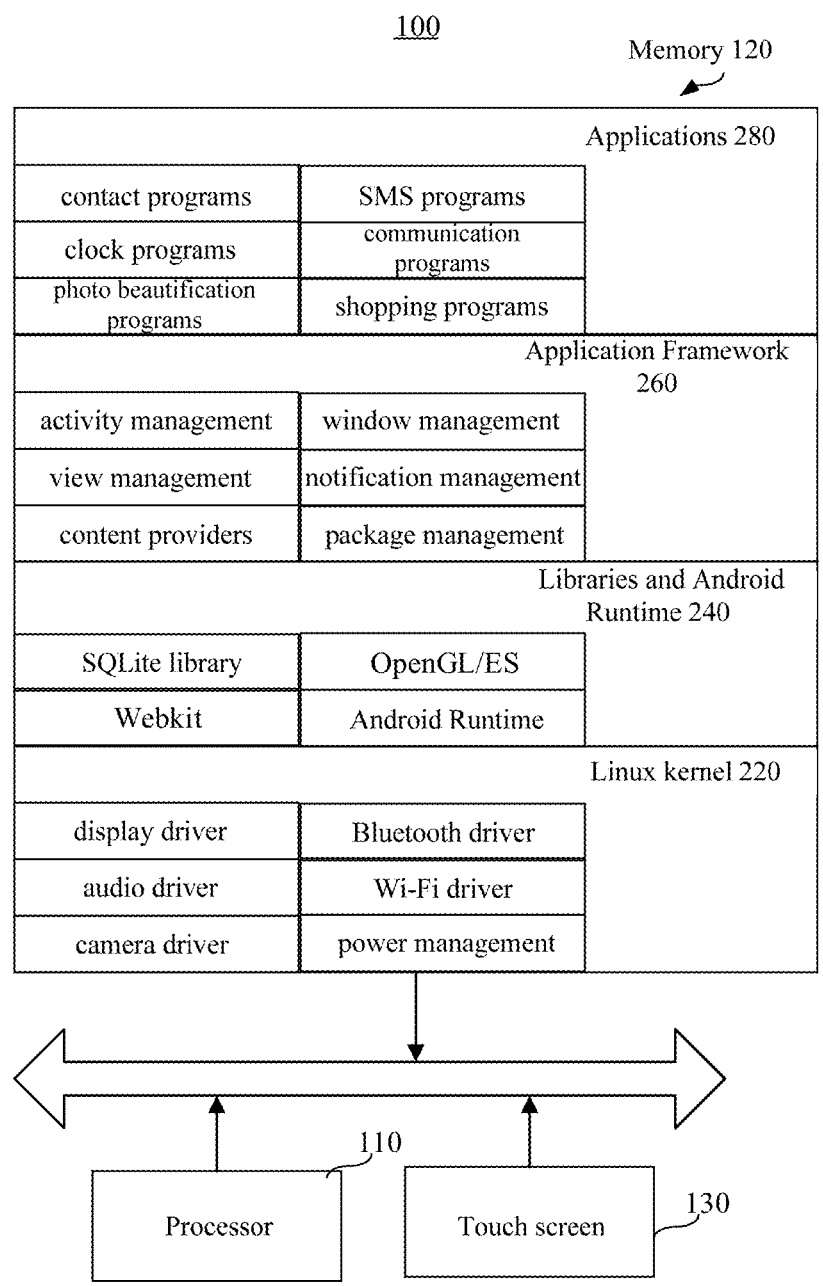
FIG. 1 is a structural block diagram of a terminal according to an embodiment of the disclosure.
Figure 2:
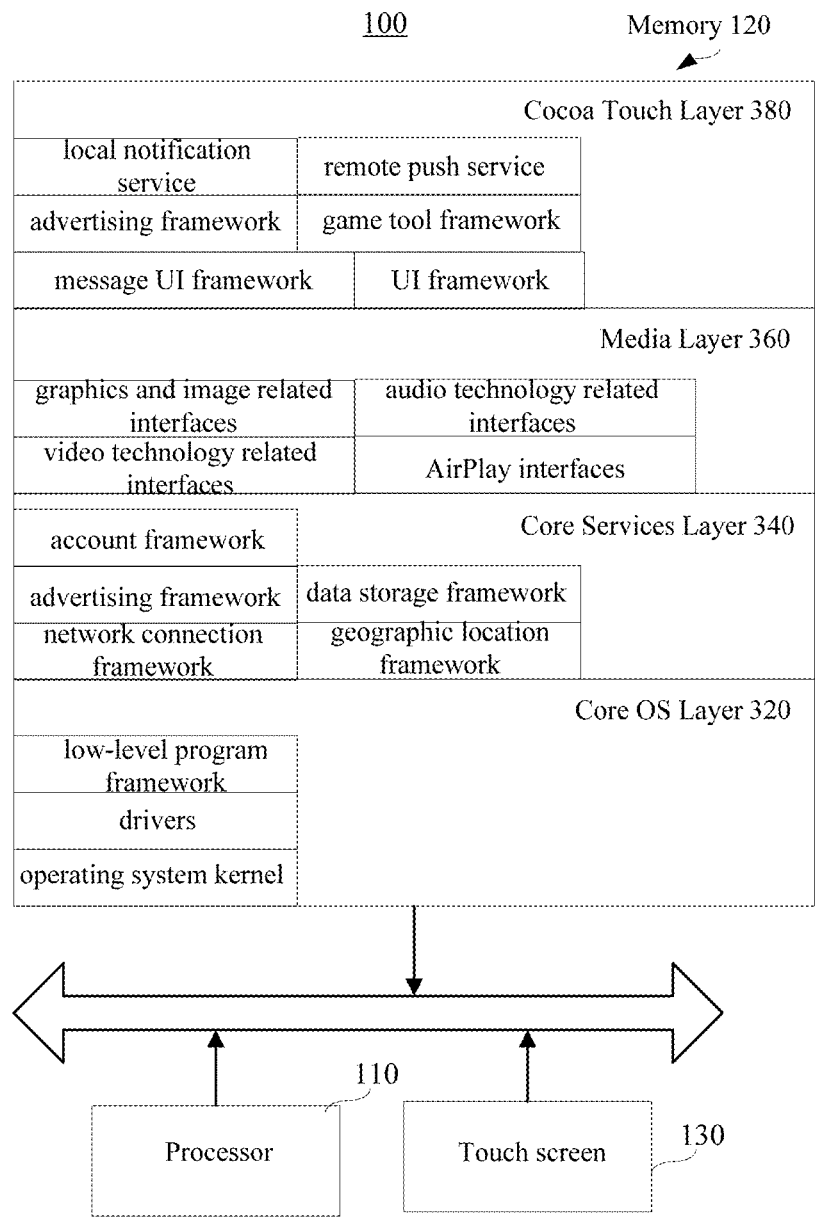
FIG. 2 is a structural block diagram of a terminal according to another embodiment of the disclosure.

Please refer to FIG. 1 and FIG. 2, which are structural block diagrams of a terminal 100 according to an embodiment of the disclosure. The terminal 100 may be a mobile phone, a tablet computer, a notebook computer, an e-book or the like. The terminal 100 of the disclosure may include one or more of the following components: a processor 110, a memory 120, and a touch screen 130

The processor 110 may include one or more processing cores. The processor 110 uses various interfaces and lines to connect various parts of the entire terminal 100, and executes the various functions and data processing of the terminal 100 by running or executing instructions, programs, code sets or instruction sets stored in the memory 120 and by calling data stored in the memory 120. In some embodiments, the processor 110 may use at least one hardware form of Digital Signal Processing (DSP), Field-Programmable Gate Array (FPGA), and Programmable Logic Array (PLA) to implement the executions. The processor 110 may integrate one or more of a Central Processing Unit (CPU), a Graphics Processing Unit (GPU), and a modem. The CPU mainly handles the operating system, user interfaces, and application programs; the GPU is responsible for rendering and drawing of the content required to be displayed by the touch screen 130; and the modem is used for processing wireless communication. It can be understood that the modem may not be integrated into the processor 110, and may be implemented by a single chip.

The memory 120 may include Random Access Memory (RAM), and may also just include Read-Only Memory. In some embodiments, the memory 120 includes a non-transitory computer-readable storage medium. The memory 120 may be used to store instructions, programs, codes, code sets, or instruction sets. The memory 120 may include a program storage area and a data storage area. The program storage area may be configured to store instructions for implementing an operating system, instructions for at least one function such as a touch function, a sound playback function, an image playback function, etc., the instructions for implementing the following method embodiments. The data storage area may store data such as audio data, phone book and the like that are created by the use of the terminal 100. The memory 120 also stores at least one instruction, which is configured to implement the information display method of the following embodiments when executed by the processor 110.

Taking the operating system is an Android system as an example, the programs and data stored in the memory 120 are shown in FIG. 1. The memory 120 stores the Linux kernel 220, the Libraries and Android Runtime 240, the Application Framework 260 and Applications 280. The Linux kernel 220 provides low-level drivers for various hardware of the terminal 100, such as a display driver, an audio driver, a camera driver, a Bluetooth driver, a Wi-Fi driver, and power management. The Libraries and Android Runtime 240 provides main feature support for the android system through some C/C++ libraries. For example, the SQLite library provides the support of database, the OpenGL/ES library provides the support of 3D drawing, and the Webkit library provides the support of browser kernel. The Libraries and Android Runtime 240 also provides the Android Runtime, which mainly provides some core libraries, which can allow developers to write Android applications using the Java language. The Application Framework 260 provides various APIs that may be used when building applications. Developers can also use these APIs to build their own applications, such as activity management, window management, view management, notification management, content providers, Package management, call management, resource management, location management. There is at least one application program is running in the Applications 280, and the at least one application program may be programs come with the operating system, such as contact programs, SMS programs, clock programs, camera applications, etc.; the at least one application program may be applications developed by third-party developers, such as communication programs, photo beautification programs, etc.

Taking the operating system is an IOS system as an example, the programs and data stored in the memory 120 are show in FIG. 2. The IOS system includes a Core OS Layer 320, a Core Services Layer 340, a Media Layer 360 and a Cocoa Touch Layer 380. The Core OS Layer 320 includes an operating system kernel, drivers, and low-level program frameworks. These low-level program frameworks provide functions closer to hardware for the program frameworks located in the Core Services Layer 340 to use. The Core Services Layer 340 provides system services and/or program frameworks required by application programs, such as a foundation framework, an account framework, an advertising framework, a data storage framework, a network connection framework, a geographic location framework, a motion framework, and the like. The Media Layer 360 provides audio-visual-related interfaces for applications, such as graphics and image related interfaces, audio technology related interfaces, video technology related interfaces, and audio and video transmission technologies such as AirPlay interfaces. The Cocoa Touch Layer 380 provides various commonly-used interface-related frameworks for application development. The Cocoa Touch Layer 380 is responsible for user touch interaction operations on the terminal 100. For example, local notification service, remote push service, advertising framework, game tool framework, message user interface (UI) framework, user interface UIKit framework, map framework, etc.

The frameworks illustrated in FIG. 2, in which related to most applications but are not limited to, are the basic framework of the Core Services Layer 340 and the UIKit framework of the Cocoa Touch Layer 380. The basic framework provides many basic object classes and data types, and provides the most basic system services for all applications, regardless of the UI. The classes provided by the UIKit framework are basic UI class libraries for creating touch-based user interfaces. IOS applications can provide UI based on the UIKit framework, so it provides the basic framework of the applications for building user interfaces, drawings, processing interaction events with the user, responding to gestures, etc.

The touch screen 130 is configured to receive touch operations on or near it by the user using a finger, a touch pen, or any suitable object, and to display respective user interfaces of applications. The touch screen 130 is generally disposed on a front panel of the terminal 130. The touch screen 130 may be designed as a full screen, a curved surface screen or a special-shaped screen. The touch screen 130 can also be designed as a combination of the full screen and the curved screen, and a combination of the special-shaped screen and the curved screen, which is not limited in this embodiment.

Full Screen

The full screen may refer to a screen design in which the touch screen 130 occupies the front panel of the terminal 100 with a screen-to-body ratio exceeding a threshold (such as 80% or 90% or 95%). A method for calculating the screen-to-body ratio is: (the area of the touch screen 130/the area of the front panel of the terminal 100)*100%; another method for calculating the screen-to-body ratio is: (the area of an actual display area in the touch screen 130/the area of the front panel of the terminal 100)*100%; still another method for calculating the screen-to-body ratio is: (a diagonal line of the touch screen 130/a diagonal line of the front panel of the terminal 100)*100%. For example, as shown in FIG. 3, the touch screen 130 occupies almost all areas on the front panel of the terminal 100, that is, except for the edges generated by the middle frame 41, all other areas of the front panel 40 of the terminal 100 are the touch screen 130. The four corners of the touch screen 130 may be right-angled or rounded.

The full screen may also be a screen design in which at least one component of the front panel is integrated inside or below the touch screen 130. In some embodiments, the at least one front panel component includes a camera, a fingerprint sensor, a proximity light sensor, a distance sensor, and the like. In some embodiments, other components of the front panel of the conventional terminal may be integrated in all or part of the touch screen 130. For example, the photosensitive component in the camera may be separated into multiple photosensitive pixels, each photosensitive pixel can be integrated in a black area of respective display pixel in the touch screen 130. Due to the at least one component of the front panel is integrated into the touch screen 130, the full screen may have a higher screen ratio.

In other embodiments, the component of the front panel of the conventional terminal can also be set on the side or back of the terminal 100. For example, an ultrasonic fingerprint sensor may be set under the touch screen 130, a bone-conduction receiver can be set inside the touch screen 130, and a camera is set as a pluggable structure and is disposed on the side of the terminal.

In some optional embodiments, when the terminal 100 adopts the full screen, one or more edge touch sensor 120 may be disposed at one side, or two sides (such as the left and the right sides), or four sides (such as the upper, the lower, the left and the right sides) of the middle frame of the terminal 100. The edge touch sensor 120 is configured to detect at least one of the operations such as a touch operation, a click operation, a press operation and a slide operation on the middle frame by the user. The edge touch sensor 120 may be any one of a touch sensor, a thermal sensor and a pressure sensor. The user can operate on the edge touch sensor 120 to control the applications in the terminal 100.

Curved Surface Screen

Figure 3A:
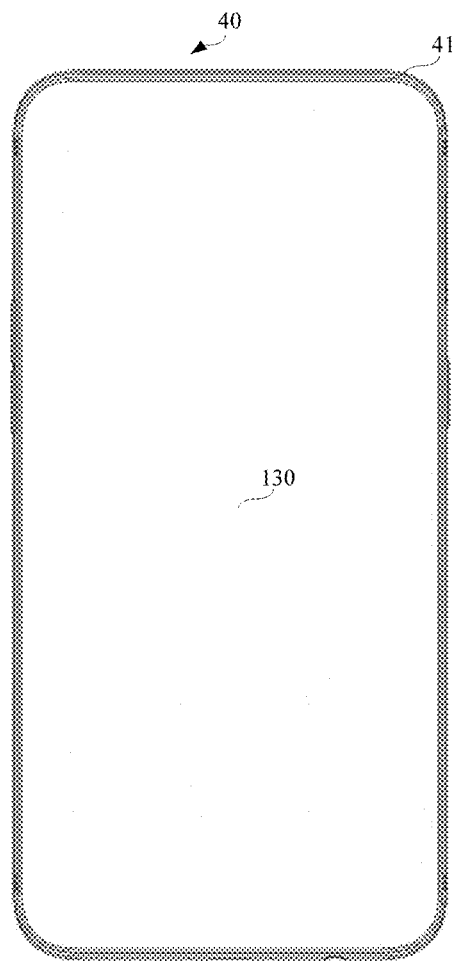
FIG. 3A to FIG. 3F are schematic diagrams of terminals with different touch screens according to embodiments of the disclosure.
Figure 3B:
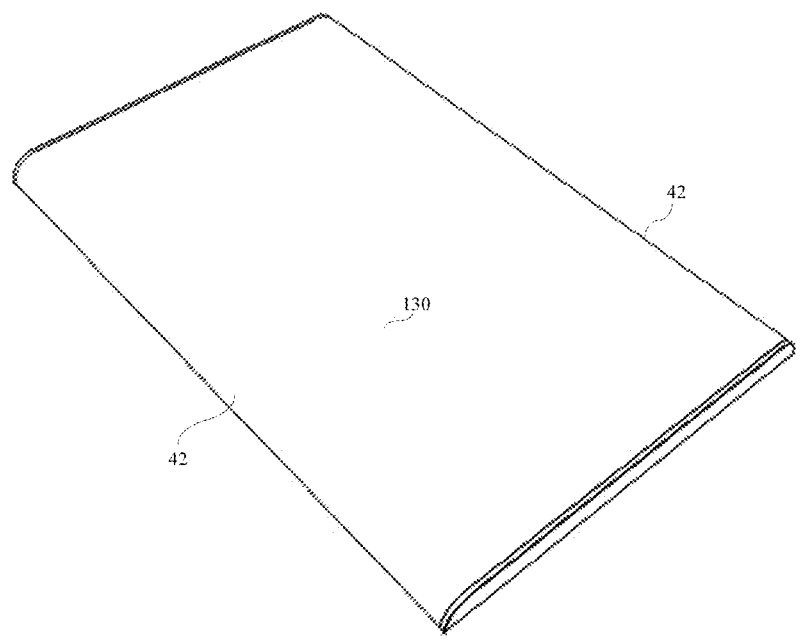

The curved surface screen refers to a screen design in which a display area of the touch screen 130 is not located in a plane. Generally, the curved surface screen is a screen design which has a cross section curved in shape, and the projection of the curved surface screen in any plane direction perpendicular to the cross section is a plane, wherein the curved shape may be U-shaped. In some embodiments, the curved surface screen refers to that at least one side of the touch screen 130 extends and covers the middle frame of the terminal 100. Since the side of the touch screen 130 extends and covers the middle frame of the terminal 100, the middle frame that originally has no display function and touch function is covered to be displayable area and/or operable area, so that the curved surface screen has a higher screen-to-body ratio. In some embodiments, in the embodiment as shown in FIG. 3B, the curved surface screen refers to a screen design that the left side and the right side 42 are curved in shape, or the upper side and the lower side are curved in shape, or four sides of the upper side, the lower side, the left side and the right side are curved in shape. In alternative embodiments, the curved surface screen is made of a touch screen material with certain flexibility.

Special-Shaped Screen

The special-shaped screen is a touch screen with an irregular shape, the irregular shape is not a rectangle or a rounded rectangle. In some embodiments, the special-shaped screen refers to a screen design that has protrusions, notches, and/or holes on the rectangular or rounded rectangular touch screen 130. In some embodiments, the protrusions, notches, and/or holes can be located at an edge of the touch screen 130, a central portion of the touch screen 130, or both of the edge and the central portion of the touch screen 130. When the protrusions, notches and/or holes is/are defined at one edge, it can be set at the middle position or two ending position of the edge; when the protrusions, notches and/or holes is/are defined at the central portion of the screen, it can be set at one or more of the regions including the upper region, the upper left region, the left region, the lower left region, the lower region, the lower right region, the right region, and the upper right region of the screen. The protrusions, notches and/or holes is/are be distributed either centrally or decentrally, symmetrically or asymmetrically, when defined in multiple regions. In some embodiments, the number of the protrusions, notches and/or holes is not limited.

The special-shaped screen covers the upper and/or the lower forehead area of the touch screen as the displayable area and/or the operable area, so that the touch screen takes up more space on the front panel of the terminal, so the special-shaped screen also has larger screen-to-body ratio. In some embodiments, the notches and/or holes are used to accommodate at least one component of the front panel, which includes at least one of a camera, a fingerprint sensor, a proximity light sensor, a distance sensor, an earpiece, an ambient light sensor, and a physical button.

Figure 3C:
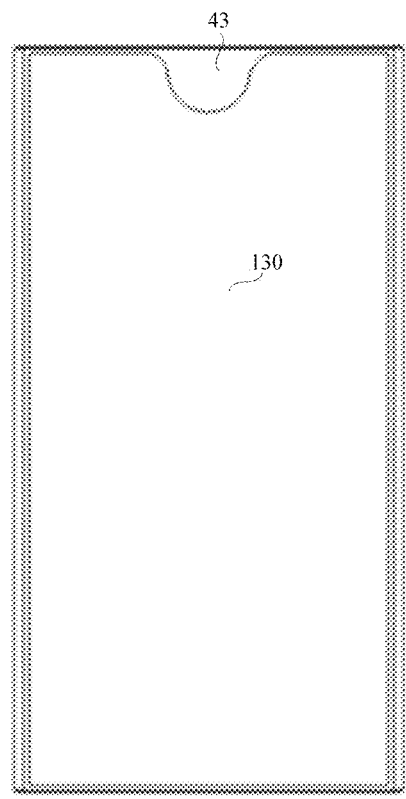
Figure 3D:
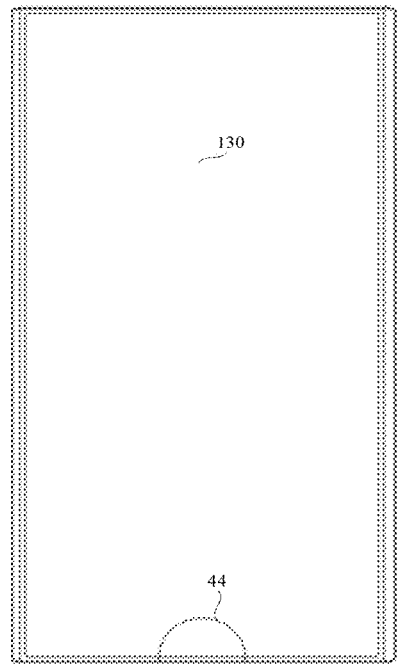
Figure 3E:
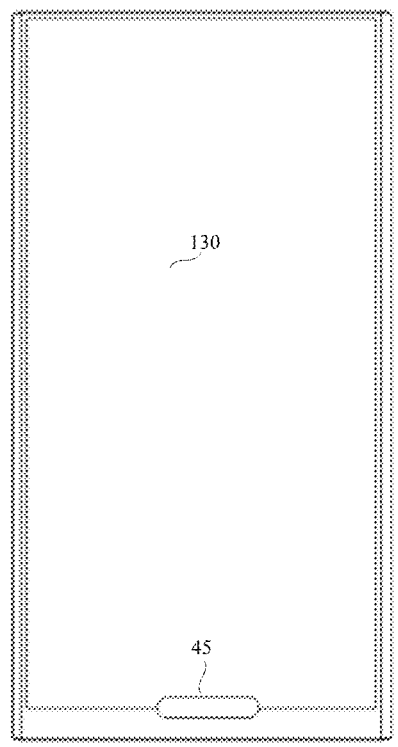
Figure 3F:
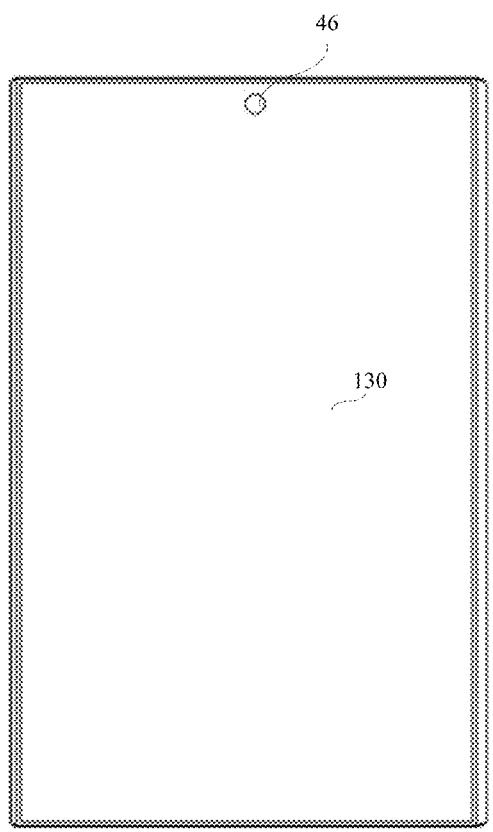

For example, the notch may be defined at one or more edges of the special-shaped screen, and the notch may be a semi-circular notch, a right-angled rectangular notch, a rounded rectangular notch, or an irregularly-shaped notch. In the embodiment as shown in FIG. 3C, the special-shaped screen may be a screen design that a semi-circular notch 43 is defined at a middle position of an upper edge of the touch screen 130. The space of the semi-circular notch is used to accommodate at least one component of the front panel such as a camera, a distance sensor (also known as a proximity sensor), an earpiece, and an ambient light brightness sensor. As shown in FIG. 3D, the special-shaped screen may be a screen design that a semi-circular notch 44 is defined at a middle position of a lower edge of the touch screen 130. The space of the semi-circular notch is used to accommodate at least one component of a physical button, a fingerprint sensor and a microphone. In the embodiment as shown in FIG. 3E, the special-shaped screen may be a screen design that a semi-elliptical notch 45 at a middle position of a lower edge of the touch screen 130, meanwhile, another semi-elliptical notch is formed in the front panel of the terminal 100, the two semi-elliptical notches enclose an elliptical area which is used to accommodate a physical button or a fingerprint recognition module. In the embodiment as shown in FIG. 3F, the special-shaped screen may be a screen design that at least one small hole 45 is defined at the upper half of the touch screen 130. The space of the small hole is used to accommodate at least one component of the front panel such as a camera, a distance sensor, an earpiece, and an ambient light brightness sensor.

In addition, the person skilled in the art can understand that the structure of the terminal 100 shown in the above drawings does not constitute a limitation to the terminal 100. The terminal may include more or less components than that illustrated in the figure, or the terminal may combine some components, or the terminal may have different component arrangements. For example, the terminal 100 further includes components such as a radio frequency circuit, an input unit, a sensor, an audio circuit, a wireless fidelity (WiFi) module, a power supply, a bluetooth module and the like, and are not described herein again.

Figure 4:
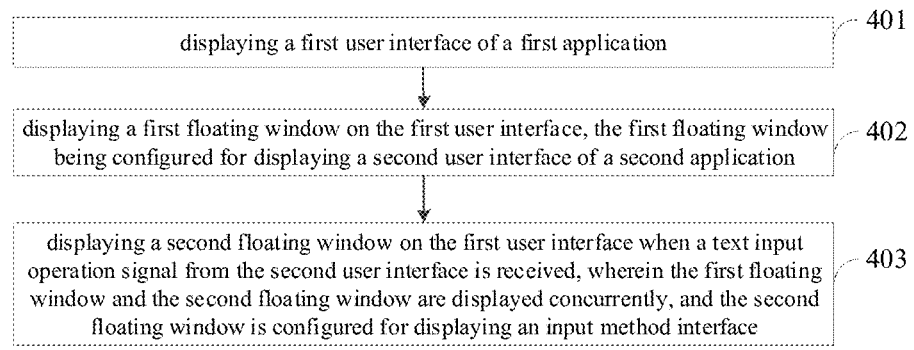
FIG. 4 is a schematic flowchart of a method for displaying an input method interface, according to an embodiment of the disclosure.

As illustrated in FIG. 4, it is a schematic flowchart of a method for displaying an input method interface according to an exemplary embodiment of the disclosure. This embodiment is exemplified by applying the method to the terminal 100. The method includes the follows.

Step 401, a first interface of a first application is displayed.

In some embodiments, the whole display area of the screen of the terminal is used to display the first user interface.

In some embodiments, the screen of the terminal includes a main display area and an auxiliary display area. The main display area and the auxiliary display area are different display areas on the same screen, the area of the main display area is a first display area, the area of the auxiliary display area is a second display area, and the first display area of the main display area is larger than the second display area of the auxiliary display area. The main display area of the display screen is used to display the first user interface.

In some embodiments, the main display area is adjacent to the auxiliary display area, and the total display area of the main display area and the auxiliary display area is equal to the available display area of the screen.

In some embodiments, when the screen is a special-shaped screen, the main display area is a rectangular display area of the special-shaped screen, and the auxiliary display area is a special-shaped display area of the special-shaped screen, and the combination of the main display area and the auxiliary display area is equal to the whole display area. Schematically, three sides of the special-shaped screen are straight sides, and the remaining side is a curved side with a concave portion. The main display area is the largest rectangle divided according to the three straight sides and an edge of the concave portion. The auxiliary display area is the remaining region except the main display area. In some embodiments, the screen may include just one auxiliary display area or two auxiliary display areas.

In some embodiments, when the screen is a rectangular screen (including a rectangular screen with rounded corners), the main display area may be a rectangular display area, and the auxiliary display area may be a bar-shaped region positioned at one side of the screen, such as the region configured for displaying the status bar or the navigation bar. When the screen is a curved-surface screen, the main display area may be a flat display area, and the auxiliary display area may be a curved-surface display area positioned at one side of the screen. The embodiments of the disclosure do not limit the positions of the main display area and the auxiliary display area.

The first application is an application running in the foreground. When the user operates the first application, the terminal displays the first user interface of the first application, and the first user interface refers to the program interface of the first application.

Step 402, a first floating window is displayed on the first user interface, and the first floating window is configured for displaying a second user interface of a second application.

Ways of triggering the display of the first floating window are not limited. In some embodiments, when the screen of the terminal includes the main display area and the auxiliary display area, the terminal displays a program icon of the second application on the auxiliary display area in advance, or the program icon of the second application may be displayed on the auxiliary display area when the terminal is oriented landscape, or the program icon of the second application may be displayed according to a received operation signal. When a click operation signal on the program icon is received, the terminal displays the first floating window on the first user interface.

When the display area of the auxiliary display area is limited to be small, the auxiliary display area may display only one program icon of the second application. When the display area of the auxiliary display area is relatively large and the auxiliary display area is relatively empty, the auxiliary display area may also display program icons of a third application, a fourth application, and other applications. The second application may be an application that has not been started yet, or an application run in background. The embodiments of the disclosure do not limit the running state of the second application.

Figure 5:
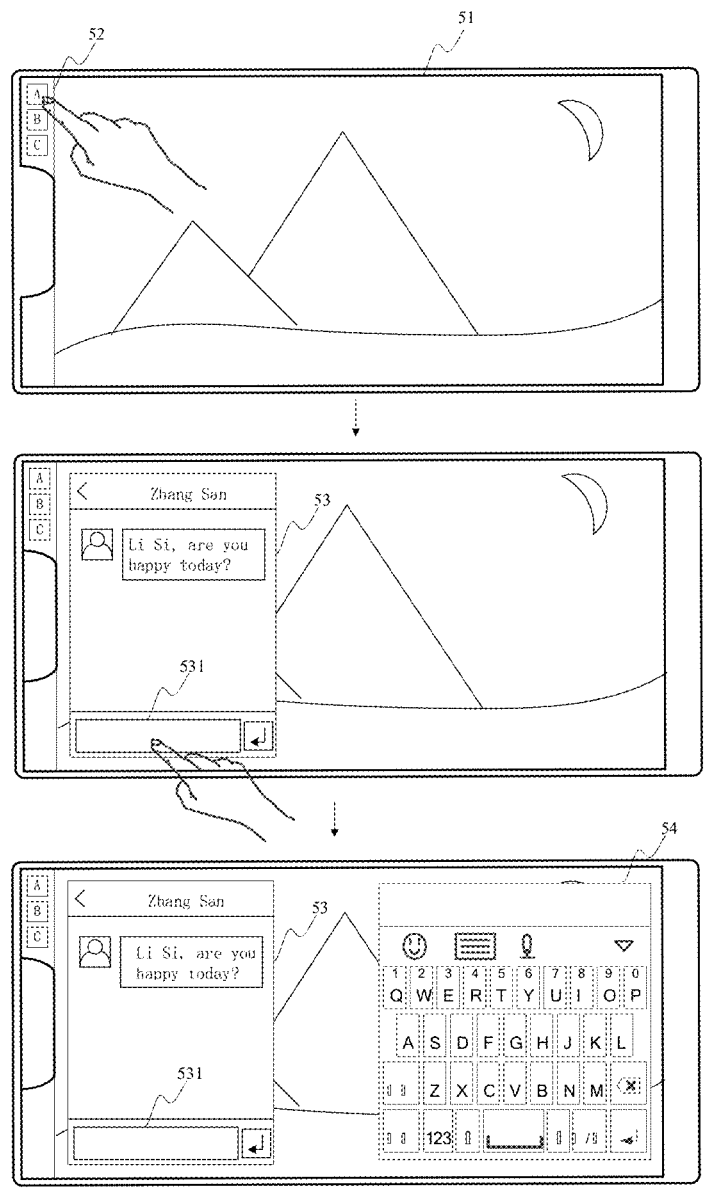
FIG. 5 is a schematic diagram showing user interfaces of the method for displaying an input method interface, according to the embodiment of the disclosure.

Schematically, as shown in FIG. 5, the terminal displays a first user interface 51 on the main display area, and program icons of a second application A, an application B, and an application C are displayed on an auxiliary display area 52. When the terminal receives a click signal on the program icon of the second application A, a first floating window 53 is superimposed or popped on the first user interface 51, and the first floating window 53 is used to display a second user interface of the second application A.

Step S403, a second floating window is displayed on the first user interface when a text input operation signal from the second user interface is received, wherein the first floating window and the second floating window are displayed concurrently, and the second floating window is configured for displaying an input method interface.

In some embodiments, when the second user interface includes a text input control such as a text input box or a text box pop-up button, and a trigger signal of the text input control is received, the terminal determines that the text input operation signal is received, and displays the first floating window meanwhile the second floating window containing the input method interface.

The input method interface includes but is not limited to a keyboard, an expression input control, and a quick reply control. Moreover, the keyboard may be any one of a nine keys keyboard, a QWERTY keyboard, a Wubi input keyboard, or a handwriting keyboard.

In order to avoid covering the second user interface, the first floating window and the second floating window do not overlap each other.

Exemplary, as illustrated in FIG. 5, the second user interface includes a text input box 531, when the user clicks the text input box 531, the terminal superimposes or pops a second floating window 54 on the first user interface 51, the second floating window 54 includes an input method interface.

In summary, in the method provided in this embodiment, the second user interface of the second application is displayed on the first user interface of the first application in the form of a first floating window. When it is required to enter texts in the second user interface, the input method interface is displayed on the first user interface in the form of a second floating window. Therefore, the user can enter texts in the second floating window. It simplifies operation steps of the user when switching between different applications, and the efficiency of human-computer interaction is improved. Meanwhile, displaying the input method interface in the form of a floating window can reduce the occlusion of the first user interface, which is convenient for the user to quickly perform text input operations in the second application while using the first application.

In some embodiments, displaying the second floating window on the first user interface includes:
superimposing and displaying the second floating window on a portion of the display area of the first user interface, according to a display area of the first floating window on the first user interface, wherein the first floating window and the second floating window do not overlap with each other.

In some embodiments, superimposing and displaying the second floating window on a portion of the display area of the first user interface according to the display area of the first floating window on the first user interface includes:
displaying the second floating window at the left side of the first floating window, when the terminal is in landscape orientation, and a display area at the left side of the first floating window is larger than a display area at the right side of the first floating window;
displaying the second floating window at the right side of the first floating window, when the terminal is in landscape orientation, and the display area at the left side of the first floating window is less than the display area at the right side of the first floating window.

In some embodiments, displaying the second floating window on the first user interface includes:
when the terminal is in landscape orientation and is in the left-hand holding state, superimposing and displaying the second floating window on a display area at the right side of the first user interface, and superimposing and displaying the first floating window on a display area at the left side of the first user interface;
when the terminal is in landscape orientation and is in the right-hand holding state, superimposing and displaying the second floating window on the display area at the left side of the first user interface, and superimposing and displaying the first floating window on the display area at the right side of the first user interface.

In some embodiments, there is a split button displayed in the second floating window in landscape orientation;
the method further includes:
splitting the second floating window into a third floating window and a fourth floating window when an operation signal on the split button is received, wherein the third floating window and the fourth floating window are respectively configured for displaying a portion of the input method interface;
moving the first floating window to a central display region of the first user interface;
displaying the third floating window at a left side region of the central display region, and displaying the fourth floating window at a right side region of the central display region.

In some embodiments, a first hidden button is displayed in the first floating window, and a second hidden button is displayed in the second floating window;
the method further includes:
cancelling/disabling the display of the first floating window and the second floating window, when an operation signal on the first hidden button is received;
or,
cancelling/disabling the display of the second floating window, when an operation signal on the second hidden button is received.

In some embodiments, after displaying the second floating window on the first user interface, the method further includes:
setting the second floating window to be displayed with a first transparency when a window focus is at the second floating window;
setting the second floating window to be displayed with a second transparency when the window focus is at the first floating window, wherein the first transparency is smaller than the second transparency.

In some embodiments, the method further includes:
detecting a position of a window focus;
setting the first floating window to be displayed with a third transparency when the window focus is at the second floating window;
setting the first floating window to be displayed with a fourth transparency when the window focus is at the first floating window, wherein the third transparency is larger than the fourth transparency.

In some embodiments, there is a move region displayed in the second floating window, the method further includes:
changing, according to a received operation signal from the move region, the display area of the second floating window displayed on the first user interface.

Figure 6:
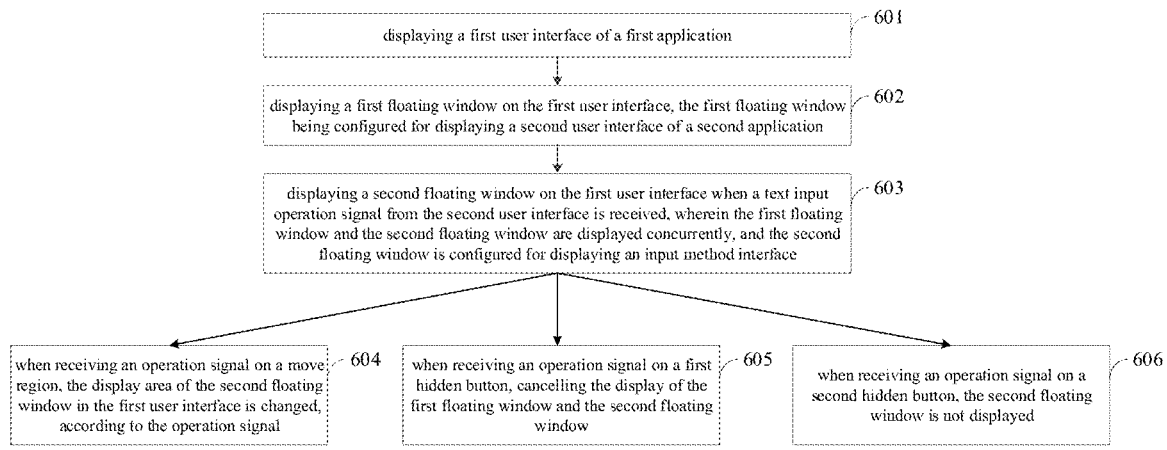
FIG. 6 is a schematic flowchart of a method for displaying an input method interface, according to another embodiment of the disclosure.

Please refer to FIG. 6, which illustrates a flowchart of a method for displaying an input method interface, provided by an exemplary embodiment of the disclosure. The embodiment is exemplified by applying the method to the terminal 100. The method includes the follows.

Step 601, a first user interface of a first application is displayed.

In a possible embodiment, when the screen of the terminal is a special-shaped screen, the main display area is a rectangular display area of the special-shaped screen, and the auxiliary display area is a special-shaped display area of the special-shaped screen, and the first user interface is displayed on the main display area.

Exemplary, three sides of the special-shaped screen are straight sides, and the remaining side is a curved side with a concave portion. The main display area is the largest rectangle divided according to the three straight sides and an edge of the concave portion. The auxiliary display area is the remaining region except the main display area. In the embodiment, the screen includes two auxiliary display areas, that is, a first auxiliary display area located on the right side of the terminal and a second auxiliary display area located on the left side of the terminal. Of course, the first auxiliary display area and the second auxiliary display area can also be regarded as a whole and treated as one auxiliary display area.

In the initial state, when the terminal is in portrait orientation, status bar information can be displayed on the first auxiliary display area. The status bar information includes at least one of the operator's name, signal strength, network standard, time, date, battery power, wireless fidelity (WiFi) network information, and Bluetooth information. When the terminal is in landscape orientation, the first auxiliary display area may not display any content, or display a fixed-color (such as black) background, or display content matching the first application.

Step 602, a first floating window is displayed on the first user interface, and the first floating window is configured for displaying a second user interface of a second application.

In a possible embodiment, the user triggers the terminal to display the first floating window by clicking a program icon displayed in the auxiliary display area. In some embodiments, the auxiliary display area includes a first long side, a first short side, a second long side and a second short side. In some embodiments, the first long side and the second long side are parallel straight sides, and the first short side and the second short side may be straight sides or curved sides. A distance between the first long side and the main display area is greater than a distance between the second long side and the main display area. For example, the distance between the first long side and the main display area is 30 pixels, and the distance between the second long side and the main display area is 0 pixel.

When a sliding signal sliding from the first long side to the second long side is received, the terminal switches the initial display content displayed on the auxiliary display area to be a program icon of the second application.

In some embodiments, the second application and the first application are different applications. If the second application is an application having a message receiving function, a corner marker may be displayed on the program icon of the second application, and the corner marker is configured to indicate that the second application has one or more unread messages. For example, the second application may be any one of a short message program, a mail application program, an instant communication program, a microblog program, and a voice communication program.

Figure 7:
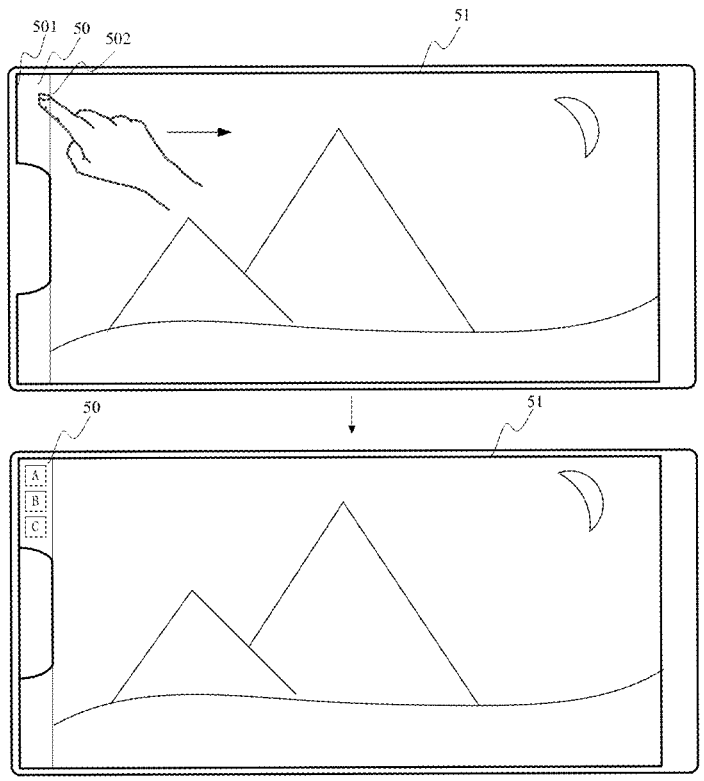
FIG. 7 to FIG. 12 are schematic diagrams showing user interfaces of the method for displaying an input method interface, according to the embodiment of FIG. 6.

Referring to FIG. 7, when the terminal receives a first sliding signal from the auxiliary display area 50, the terminal displays the application icons of the application A, the application B, and the application C on the auxiliary display area 50. Illustratively, this figure takes the application B as the second application as an example. The sliding signal refers to a signal that slides from the first long side 501 of the auxiliary display area 50 towards the second long side 502.

In an optional embodiment, the terminal displays the program icon of the second application on the auxiliary display area, when the terminal receives the sliding signal from the auxiliary display area and the terminal is in landscape orientation. Illustratively, the terminal may only respond to the sliding signal in the landscape orientation and do not respond to the sliding signal in the portrait orientation. For example, when the terminal receives the sliding signal on the auxiliary display area, the terminal detects whether it is in landscape orientation; when it is landscape orientated, the program icon of the second application is displayed on the auxiliary display area; otherwise, the terminal does not respond to the sliding signal, or responds to the sliding signal in other ways, which may be a pop-up notification bar. For another example, when the terminal is in portrait orientation, the signal receiving function of the auxiliary display area is inactivated; when the terminal is in landscape orientation, the signal receiving function of the auxiliary display area is activated, thereby enabling the auxiliary display area to display the program icon of the second application when receiving the sliding signal.

When receiving an operation signal on the program icon of the second application, the terminal superimposes and displays the first floating window on a portion of the first user interface, the first floating window is used to display the second user interface of the second application.

If it is needed to use the second application, the user clicks the program icon of the second application on the auxiliary display area. The terminal receives the operation signal on the program icon. In some embodiments, the operation signal is any one of a click signal, a double-click signal, and a long-press signal. This embodiment takes the operation signal is a click signal as an example to illustrate.

The terminal may superimpose and display the first floating window in a portion of the first user interface. The portion may be adjacent to the auxiliary display area, that is, a distance between the portion and the auxiliary display area is less than a threshold. When the second application is an unstarted application, the terminal starts the second application according to the operation signal, and then displays the second user interface of the second application in the first floating window. When the second application is an application running in the background, the terminal makes the application running in the background to be displayed in the first floating window.

Floating windows, also known as top-level windows or picture-in-picture windows, can be implemented by the Windows Manager window in the Android operating system. The floating window may try not to cover one or more main display elements on the first user interface. The user can operate the second user interface in the floating window, thereby controlling the running of the second application.

In some embodiments, the terminal receives a drag signal on a border or a corner of the first floating window, and changes any one of a length, a width, and a display ratio of the first floating window according to the drag signal.

In some embodiments, at least one of a first hidden button, a full-screen button, and a move button is also displayed on the first floating window.

When the user clicks the first hidden button, the terminal disables the display of the first floating window and closes the second application. Or, when the user clicks the first hidden button, the terminal disables the display of the first floating window, and switches the second application to the background running state.

When the user clicks the first hidden button, the terminal disables the display of the first floating window and closes the second application. Or, when the user clicks the first hidden button, the terminal disables the display of the first floating window, and makes the second application to be run in the background.

When the user clicks the full-screen button, the terminal displays the second user interface of the second application in the main display area in a full-screen manner, and switches the first application from a foreground running state to a background running state.

When the user drags the move region, the terminal changes the display position of the second floating window on the first user interface according to the drag operation.

Step 603, when a text input operation signal from the second user interface is received, a second floating window is displayed on a portion of the first user interface, according to a display area of the first floating window on the first user interface, wherein the first floating window and the second floating window are not overlapped.

In order to avoid the overlapping of the first floating window and the second floating window, and at the same time, in order to ensure the display effect of the input method interface in the second floating window, the terminal determines a display area of the second floating window in the first user interface based on where the display area of the first floating window is located.

In some embodiments, when the terminal is in landscape orientation, and the display area of the left side of the first floating window is larger than the display area of the right side of the first floating window, the terminal displays the second floating window on the left side of the first floating window, the second floating window is superimposed and displayed on the first user interface.

When the terminal is in landscape orientation, and the display area of the left side of the first floating window is smaller than the display area of the right side of the first floating window, the terminal displays the second floating window on the right side of the first floating window, the second floating window is superimposed and displayed on the first user interface.

When judging the size of the display area of the left and right sides of the floating window, in a possible implementation manner, the terminal acquires a first distance between a left border of the first floating window and a left border of the screen, and a second distance between a right border of the first floating window and a right border of the screen; if the first distance is larger than the second distance, the terminal determines that the display area of the left side of the first floating window is larger than the display area of the right side of the first floating window; otherwise, the terminal determines the display area of the left side of the first floating window is smaller than the display area of the right side of the first floating window.

Figure 8:
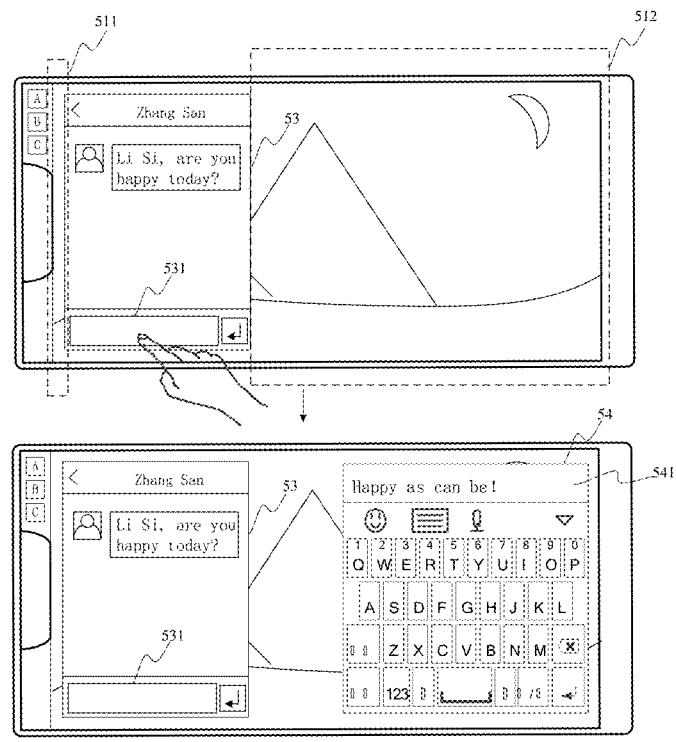
Figure 9:
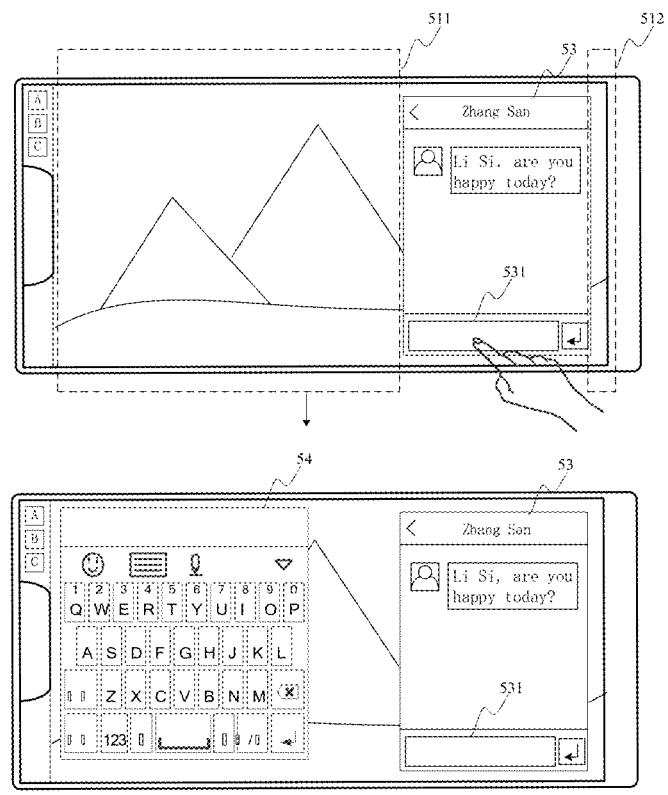

Illustratively, as shown in FIG. 8, in landscape orientation, a display area 511 at the left side of the first floating window 53 is smaller than a display area 512 at the right side of the first floating window 53, the terminal displays the second floating window 54 at the right side of the first floating window 53. As shown in FIG. 9, in landscape orientation, the display area 511 at the left side of the first floating window 53 is larger than the display area 512 at the right side of the first floating window 53, the terminal displays the second floating window 54 at the left side of the first floating window 53.

In some embodiments, in order to avoid excessive occlusion of the first user interface by the second floating window, and in order to ensure the accuracy of the input, the size of the second floating window is set to a preset window size, i.e., the minimum window size capable of clearly displaying the input method interface. Correspondingly, when the display area of the left side of the first floating window is larger than the display area of the right side of the first floating window, and the size of the display area of the left side of the first floating window is larger than the preset window size, the terminal displays the second floating window on the left side of the first floating window. When the display area of the left side of the first floating window is larger than the display area of the right side, and the size of the display area of the left side of the first floating window is smaller than the preset window size, the terminal moves the first floating window to be adjacent to the right border of the screen, and the second floating window is displayed on the left side of the first floating window to ensure the complete display of the second floating window.

When the display area of the left of the first floating window is smaller than the display area of the right, and the size of the display area of the right side of the first floating window is larger than the preset window size, the terminal displays the second floating window on the right side of the first floating window. When the display area of the left side of the first floating window is smaller than the display area of the right side of the first floating window, and the size of the display area of the right side is smaller than the preset window size, the terminal moves the first floating window to be adjacent to the left border of the screen, and the second floating window is displayed on the right side of the first floating window to ensure the complete display of the second floating window.

In other possible embodiments, when the terminal is portrait orientation, and the display area above the first floating window is larger than the display area below the first floating window, the terminal displays the second floating window above the first floating window. When the terminal is portrait orientation, and the display area above the first floating window is smaller than the display area below the first floating window, the terminal displays the second floating window below the first floating window.

Unlike the related art, which directly display the input text on the second user interface, in this embodiment, the input method interface further includes an input preview region, and the text input by the user is firstly displayed in the input preview region; when the user completes the input, the input text in the input preview area is displayed in the second user interface, thereby avoiding that the user needs to always pay attention to the text displayed in the first floating window when inputting text in the second floating window.

Schematically, as shown in FIG. 8, the second floating window 54 includes an input preview region 541 for displaying the text input by the user. When the user completes the input operation, the text in the input preview area 541 is displayed in a text input box 531 of the first user interface.

Step 604, when receiving an operation signal on a move region, the display area of the second floating window in the first user interface is changed, according to the operation signal.

In some embodiments, the second floating window includes the move region, the move region may be a button, a control, or any region of the floating window.

When the user drags the move region, the terminal changes, according to a dragging direction, the display area where the second floating window is located and displayed in the first user interface.

In some embodiments, when the second floating window after dragging, overlaps with the first floating window, the terminal automatically adjusts the display area of the first floating window to avoid the two covering/blocking each other. Or, the terminal superimposes the second floating window on the upper layer of the first floating window, that is, the second floating window partially covers the first floating window. In other words, the second floating window is displayed on atop layer of the first floating window, and is partially overlapped with the first floating window.

Figure 10:
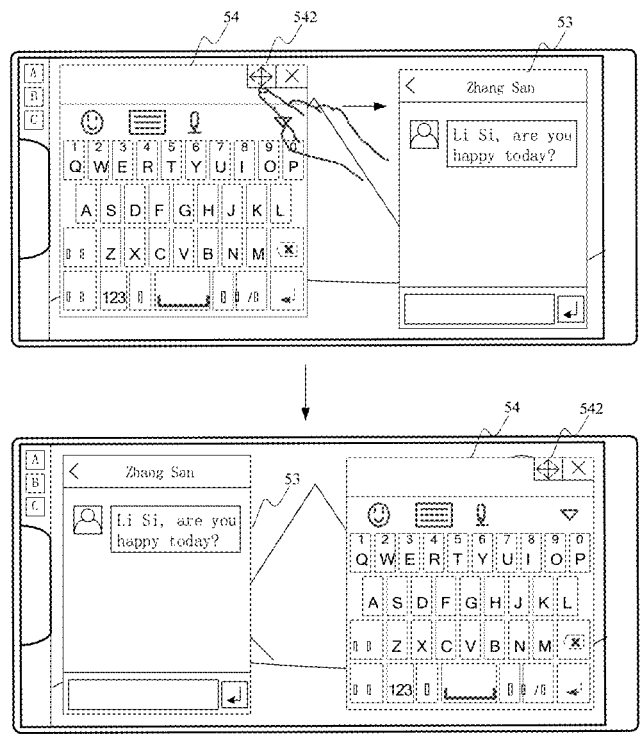

Illustratively, as shown in FIG. 10, when the user drags the move button 542 on the second floating window 54, the terminal changes the display area of the second floating window 54 following the dragging signal. Since the second floating window 54 overlaps the first floating window 53 after being dragged, the terminal simultaneously adjusts the display area of the first floating window 53. In other embodiments, the move button 542 may not be displayed, and any area of the second floating window may be used to replace the move button 542.

Step 605, when receiving an operation signal on a first hidden button, the display of the first floating window and the second floating window is disabled. That is, the first floating window and the second floating window are not displayed.

In some embodiments, the first floating window and the second floating window both further include a corresponding hidden button. The user can instruct the terminal to hide the displayed first floating window and/or the second floating window by clicking the hidden button.

When the user clicks a first hidden button in the first floating window, it indicates that the user no longer needs to perform operations in the first user interface. Therefore, when receiving the operation signal on the first hidden button, the terminal simultaneously disables the display of the first floating window and the second floating window. In some embodiments, after removing the first floating window from display, the terminal closes the second application, or switches the second application to be a background running state.

Figure 11:
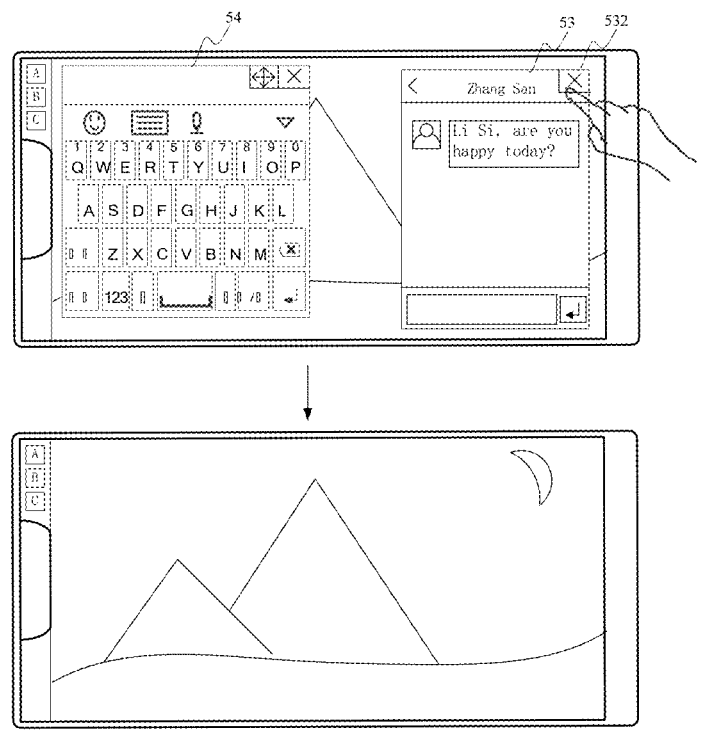

Referring to FIG. 11, when the user clicks a first hidden button 532 on the first floating window 53, the terminal simultaneously disables the display of the first floating window 53 and the second floating window 54.

Step 606, when receiving an operation signal on a second hidden button, the second floating window is not displayed.

When the user clicks the second hidden button in the second floating window, it indicates that the user no longer needs to input text. Therefore, when receiving the operation signal on the second hidden button, the terminal only disables the display of the second floating window.

Figure 12:
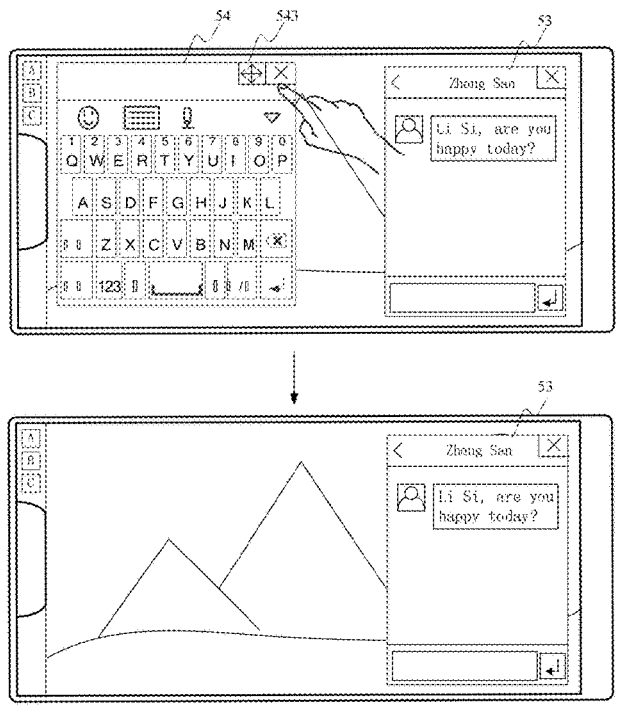

With reference to FIG. 12, when the user clicks the second hidden button 543 on the second floating window 54, the terminal disables the display of the second floating window 54 and displays only the first floating window 53.

In other embodiments, when receiving a click operation on the non-text input area in the second user interface, the terminal automatically disables the display of the second floating window. The embodiment is not limited to this.

In the method provided in this embodiment, the second user interface of the second application is displayed on the first user interface of the first application in the form of a first floating window. When it is required to enter texts in the second user interface, the input method interface is displayed on the first user interface in the form of a second floating window. Therefore, the user can enter texts in the second floating window. It simplifies operation steps of the user when switching between different applications, and the efficiency of human-computer interaction is improved. Meanwhile, displaying the input method interface in the form of a floating window can reduce the occlusion of the first user interface, which is convenient for the user to quickly perform text input operations in the second application while using the first application.

The method for displaying an input method interface provided in this embodiment, by adding the move button and the hidden buttons on the floating layer windows, the user can freely change the display position and the display state of the floating layer windows, so that the user can freely use the first application, the second application, and the both. For example, when the first application is a video player and the second application is an instant messaging program, the user can chat with other users without affecting the video playback process. For another example, when the first application is a text editing program, the second application is a dictionary program, and the user can simultaneously perform word search or translation operations during the process of text editing using the text editing program.

In order to further reduce the occlusion of the second floating window to the first user interface, after displaying the second floating window, the terminal acquires the position of the window focus (requestFocus). If the window focus is on the second floating window, it indicates that the user needs to input text, the second floating window is set to a first transparency. If the window focus is on the first floating window, it means that the user does not need to input text temporarily, so the second floating window is set to a second transparency. The first transparency is less than the second transparency. The larger the transparency, the clearer the content displayed in the first user interface behind the second floating window.

For example, when the window focus is on the second floating window, the terminal sets the transparency of the second floating window to 10%, to improve the accuracy of subsequent text input by the user. When the window focus is on the first floating window, the terminal sets the transparency of the second floating window to 80%, which is convenient for the user to view the first user interface through the second floating window.

To further reduce the occlusion caused by the first floating window to the first user interface, when the user inputs text in the second floating window, in another possible embodiment, when the window focus is on the second floating window, the terminal sets the first floating window to a third transparency. When the window focus is on the first floating window, the first floating window is set to a fourth transparency, where the third transparency is greater than the fourth transparency.

In some embodiments, when the display content in the second user interface is updated, the terminal automatically sets the transparency of the first floating window to the fourth transparency.

For example, when the window focus is on the first floating window, the terminal sets the transparency of the first floating window to 10%, which is convenient for the user to view the content displayed in the first floating window. When the window focus is on the second floating window, the terminal sets the transparency of the first floating window to 80%, to reduce the occlusion of first floating window to the first user interface. When the window focus is on the second floating window and a notification message corresponding to the second application is received, the terminal automatically sets the transparency of the first floating window to 10% (the transparency of the second floating window remains unchanged).

In other embodiments, when the window focus is on the second floating window, and no keyboard input signal is received within a preset time period (e.g., 5s), the terminal automatically increases the transparency of the second floating window. The embodiment is not limited to this.

In this embodiment, the transparency of the second floating window is automatically adjusted by the way of acquiring the window focus, so that the user can view the content in the first user interface through the second floating window, thereby preventing the user from frequently triggering operations to hide and to display the second floating window.

Figure 13:
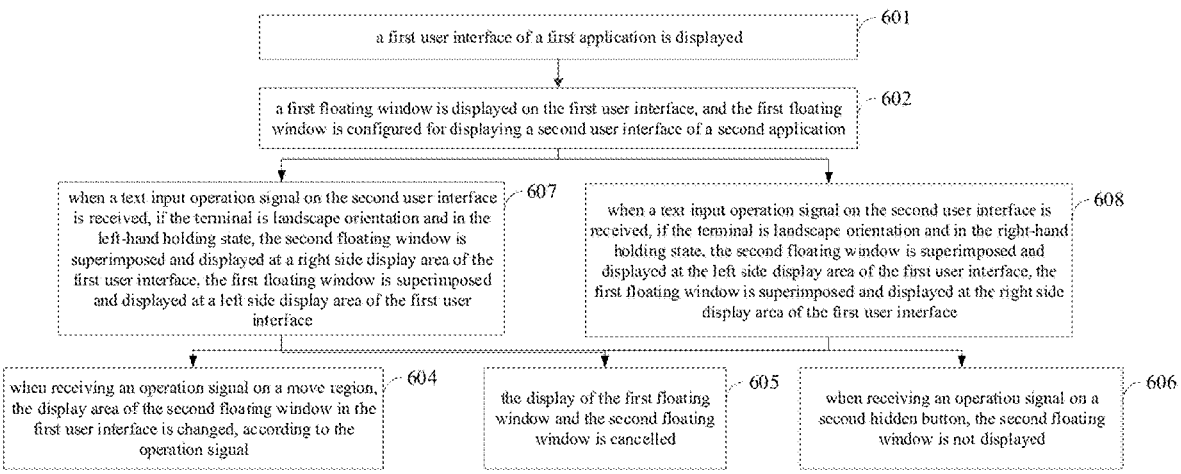
FIG. 13 is a schematic flowchart of a method for displaying an input method interface, according to still another embodiment of the disclosure.

In order to further increase the user's text input speed on the input method interface, in a possible embodiment, when the terminal is landscape orientation and in a single-hand holding state, the terminal displays the second floating window in a display area away from the hand hold it, which is convenient for the user to input text through the other hand. On the basis of FIG. 6, as shown in FIG. 13, the above step 603 can be replaced with the following steps.

Step 607, when a text input operation signal on the second user interface is received, if the terminal is landscape orientation and in the left-hand holding state, the second floating window is superimposed and displayed at a right side display area of the first user interface, the first floating window is superimposed and displayed at a left side display area of the first user interface.

In one embodiment, the terminal has a side touch function, and the side touch function is implemented by a touch sensor provided in a terminal middle frame. The touch sensor may be a capacitive sensor, a pressure sensor, or a thermal sensor. The embodiments of the disclosure do not limit the specific methods of the side touch function.

In landscape orientation, the terminal determines the holding state thereof through the side touch function, when a text input operation signal on the second user interface is received. In a possible implementation manner, the terminal determines the holding state thereof according to the distribution of the touch sensors has collected touch data. When the number of touch points on a left side frame of the terminal is greater than that on a right side frame, it is determined that the terminal is in the left-hand holding state; otherwise, it is determined that the terminal is in the right-hand holding state.

In the left-hand holding state, if the input method interface is displayed on the left side display area of the first user interface, the efficiency of inputting text with the left hand is relatively low. So, the terminal superimposes and displays the second floating window on the right side display area of the first user interface, meanwhile, the terminal superimposes and displays the first floating window on the left side display area of the first user interface. It should be noted that if the first floating window was originally displayed in the right side display area of the first user interface, the terminal needs to move the first floating window to the left side display area.

Figure 14:
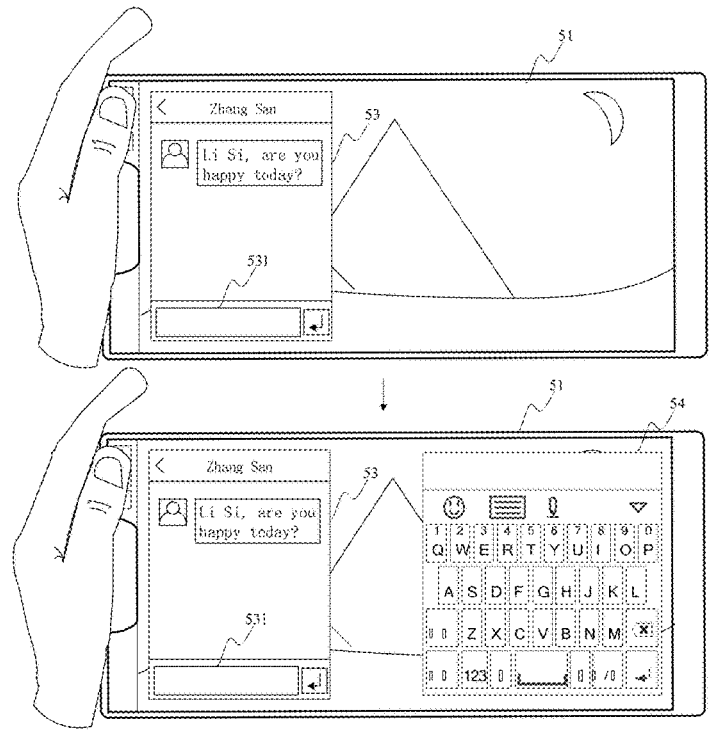
FIG. 14 is schematic diagram showing user interfaces of the method for displaying an input method interface, according to the embodiment of FIG. 13.

Schematically, as shown in FIG. 14, the terminal detects that it is currently in the left-hand holding state. When receiving an operation signal to the text input box 531, the second floating window 54 is displayed on the right side display area of the first user interface 51, to allow the user to quickly input text with the right hand.

Step 608, when a text input operation signal on the second user interface is received, if the terminal is landscape orientation and in the right-hand holding state, the second floating window is superimposed and displayed at the left side display area of the first user interface, the first floating window is superimposed and displayed at the right side display area of the first user interface.

In the right-hand holding state, if the input method interface is displayed on the right display area of the first user interface, the efficiency of inputting text with the right hand is relatively low. So, the terminal superimposes and displays the second floating window on the left side display area of the first user interface, meanwhile, the terminal superimposes and displays the first floating window on the right side display area of the first user interface. It should be noted that if the first floating window was originally displayed in the left side display area of the first user interface, the terminal needs to move the first floating window to the right side display area.

In the method for displaying an input method interface provided in this embodiment, according to the left/right holding state in landscape orientation, the terminal displays the second floating window in the display area at the side of the non-holding hand, so that the user can the input text in the input method interface through the non-holding hand, thereby further improving the efficiency of text input.

Figure 15:
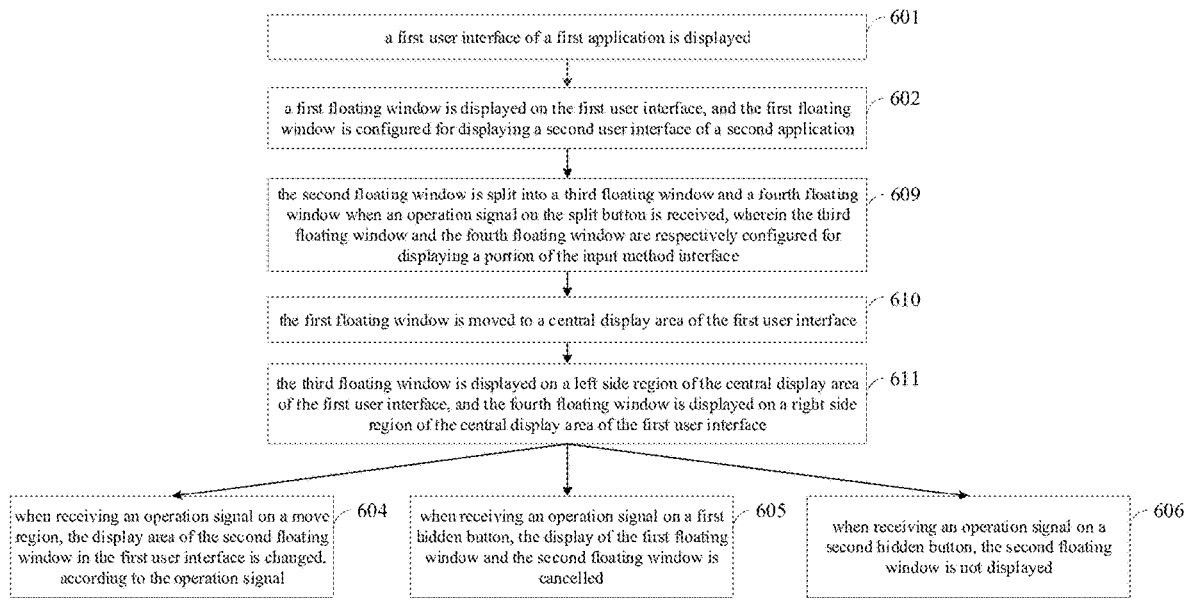
FIG. 15 is a schematic flowchart of a method for displaying an input method interface, according to still another embodiment of the disclosure.

Compared with two-handed text input, the efficiency of single-handed text input is relatively low. In one embodiment, in order to further improve the efficiency of text input when the terminal is landscape orientated, the second floating window also shows a split button. By triggering the split button, the input method interface can be divided into left and right parts, which is convenient for the user to input with two hands. On the basis of FIG. 6, as shown in FIG. 15, the method also includes the following steps after step 603.

Step 609, the second floating window is split into a third floating window and a fourth floating window when an operation signal on the split button is received, wherein the third floating window and the fourth floating window are respectively configured for displaying a portion of the input method interface.

In one possible embodiment, the terminal splits the second floating window into a third floating window and a fourth floating window with the same or similar size, wherein the third floating window includes keys on the left side of the input method interface, and the fourth floating window includes keys on the right side of the input method interface.

Figure 16:
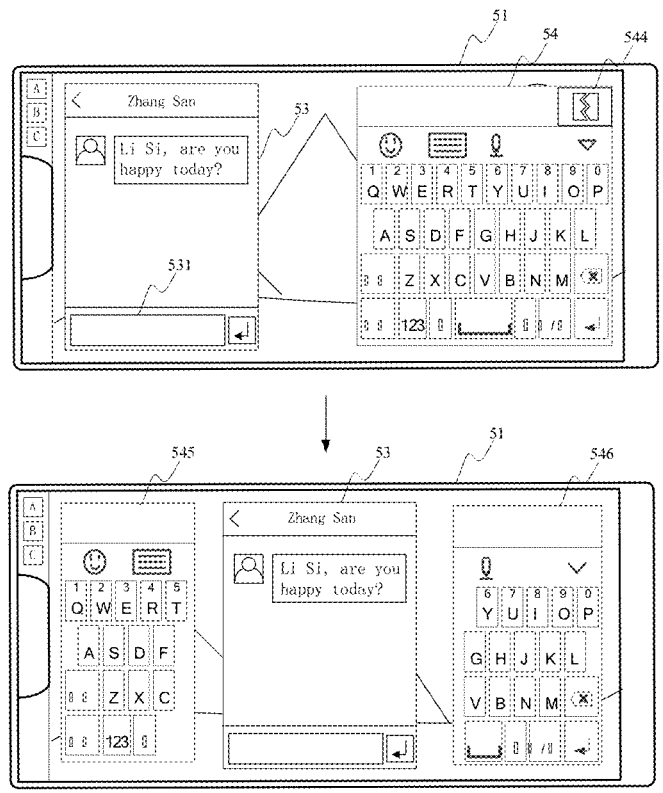
FIG. 16 is schematic diagram showing user interfaces of the method for displaying an input method interface, according to the embodiment of FIG. 15.

Schematically, as shown in FIG. 16, when receiving an operation signal on a split button 544, the terminal splits the second floating window 54 into a third floating window 545 and a fourth floating window 546, wherein the third floating window 545 includes the left half keyboard, and the fourth floating window 546 includes the right half keyboard.

This embodiment just takes triggering the split by the split button as an example. In other possible embodiments, the split can also be triggered by gestures (for example, two fingers are separated from the middle of the second floating window to two opposite sides). It is not limited in this application.

Step 610, the first floating window is moved to a central display region of the first user interface.

After the split of the floating window, the terminal moves the first floating window to the central display region of the first user interface, the central display region is located in the middle of the touch screen. Illustratively, as shown in FIG. 16, the terminal moves the first floating window 53 to the central display region.

Step 611, the third floating window is displayed on a left side region of the central display region of the first user interface, and the fourth floating window is displayed on a right side region of the central display region of the first user interface.

Further, the terminal displays the split third floating window on the left side of the first floating window, and displays the split fourth floating window on the right side of the second floating window, so that the user can quickly input text with both hands.

In some embodiments, the third floating window and/or the fourth floating window include an unsplit button, and the user can combine the third floating window and the fourth floating window into the second floating window by clicking the unsplit button; or, the user can use a gesture (for example, the third floating window and the fourth floating window are gathered and combined using two fingers) to combine the two into the second floating window.

In some embodiments, the third floating window and/or the fourth floating window include a hidden button, and the user can remove the third floating window and the fourth floating window from display by clicking the hidden button.

In the input method interface display method provided in this embodiment, the user can split the input method interface into two parts by clicking the split button in the second floating window, and display them on the left and right display areas, it is convenient for the user to input text with both hands at the same time, thereby further improving the efficiency of text input in the floating windows.

It should be noted that, regarding the display position of the first floating window and/or the second floating window, in a possible manner, the terminal recognizes and analyzes the content contained in the first user interface, so as to determine the display position of the first floating window and/or the second floating window according to a content analysis result, there is no intersection between the display position and a target display position of target content indicated by the content analysis result. That is, the display position does not overlap with a target display position of target content indicated by the content analysis result.

In some embodiments, when the first user interface is a video playback application and the content analysis result indicates that a first predetermined area of the first user interface (such as the bottom of the screen) contains subtitles, in order to avoid the first floating window and/or the second floating window covers/blocks the subtitles, there is no intersection between the first predetermined area and the display position of the first floating window and/or the second floating window determined by the terminal. In other words, the first predetermined area does not overlap with the display position of the first floating window and/or the second floating window determined by the terminal.

In some embodiments, when the first user interface is a game application and the content analysis result indicates that a second predetermined area of the first user interface (such as the lower right corner of the screen) contains operation controls, in order to avoid the first floating window and/or the second floating covers/blocks the operation controls, there is no intersection between the second predetermined area and the display position of the first floating window and/or the second floating window determined by the terminal. In other words, the second predetermined area does not overlap with the display position of the first floating window and/or the second floating window determined by the terminal.

Figure 17:
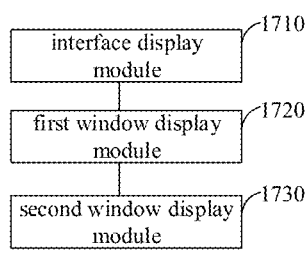
FIG. 17 is a structural block diagram of a device for displaying an input method interface, according to an embodiment of the disclosure.

Please refer to FIG. 17, which shows a structural block diagram of a device for displaying an input method interface provided by an embodiment of the disclosure. The device can be implemented as all or part of the terminal through software, hardware, or a combination of both. The device includes:

an interface display module 1710, configured to display a first user interface of a first application program;

a first window display module 1720, configured to display a first floating window on the first user interface, wherein the first floating window is configured to display a second user interface of a second application program;

a second window display module 1730, configured to display a second floating window on the first user interface when a text input operation signal from the second user interface is received, wherein the first floating window and the second floating window are displayed concurrently, and the second floating window is configured for displaying an input method interface.

In some embodiments, the second window display module 1730 is configured to: superimpose and display the second floating window on a portion of the display area of the first user interface, according to a display area of the first floating window on the first user interface, wherein the first floating window and the second floating window do not overlap with each other.

In some embodiments, the second window display module 1730 includes:

a first display unit, configured to display the second floating window at the left side of the first floating window, when the terminal is in landscape orientation, and a display area at the left side of the first floating window is larger than a display area at the right side of the first floating window; a second display unit, configured to display the second floating window at the right side of the first floating window, when the terminal is in landscape orientation, and the display area at the left side of the first floating window is less than the display area at the right side of the first floating window.

In some embodiments, the second window display module 1730 includes:

a third display unit, configured to superimpose and display the second floating window on a display area at the right side of the first user interface, and superimposing and displaying the first floating window on a display area at the left side of the first user interface, when the terminal is in landscape orientation and is in the left-hand holding state;

a fourth display unit, configured to superimpose and display the second floating window on the display area at the left side of the first user interface, and superimposing and displaying the first floating window on the display area at the right side of the first user interface, when the terminal is in landscape orientation and is in the right-hand holding state.

In some embodiments, there is a split button displayed in the second floating window in landscape orientation;

the device further includes:

a splitting module, configured to split the second floating window into a third floating window and a fourth floating window when an operation signal on the split button is received, wherein the third floating window and the fourth floating window are respectively configured for displaying a portion of the input method interface;

a first move module, configured to move the first floating window to a central display region of the first user interface;

a third window display module, configured to display the third floating window at a left side region of the central display region, and display the fourth floating window at a right side region of the central display region.

In some embodiments, a first hidden button is displayed in the first floating window, and a second hidden button is displayed in the second floating window;

the device further includes:

a first display removal module, configured to remove the first floating window and the second floating window from display, when an operation signal on the first hidden button is received; or, a second display removal module, configured to remove the second floating window from display, when an operation signal on the second hidden button is received.

In some embodiments, the device further includes:

a first setting module, configured to set the second floating window to be displayed with a first transparency when a window focus is at the second floating window;

a second setting module, configured to set the second floating window to be displayed with a second transparency when the window focus is at the first floating window, wherein the first transparency is smaller than the second transparency.

In some embodiments, the device further includes:

a third setting module, configured for setting the first floating window to be displayed with a third transparency when the window focus is at the second floating window;

a fourth setting module, configured for setting the first floating window to be displayed with a fourth transparency when the window focus is at the first floating window, wherein the third transparency is larger than the fourth transparency.

In some embodiments, there is a move region displayed in the second floating window, the device further includes:

a second move module, configured to change, according to a received operation signal from the move region, the display area of the second floating window displayed on the first user interface.

In summary, in the device provided in this embodiment, the second user interface of the second application is displayed on the first user interface of the first application in the form of a first floating window. When it is required to enter texts in the second user interface, the input method interface is displayed on the first user interface in the form of a second floating window. Therefore, the user can enter texts in the second floating window. It simplifies operation steps of the user when switching between different applications, and the efficiency of human-computer interaction is improved. Meanwhile, displaying the input method interface in the form of a floating window can reduce the occlusion of the first user interface, which is convenient for the user to quickly perform text input operations in the second application while using the first application.

In the embodiment, by adding the move button and the hidden buttons on the floating layer windows, the user can freely change the display position and the display state of the floating layer windows, so that the user can freely use the first application, the second application, and the both. For example, when the first application is a video player and the second application is an instant messaging program, the user can chat with other users without affecting the video playback process. For another example, when the first application is a text editing program, the second application is a dictionary program, and the user can simultaneously perform word search or translation operations during the process of text editing using the text editing program.

In the embodiment, the transparency of the second floating window is automatically adjusted by the way of acquiring the window focus, so that the user can view the content in the first user interface through the second floating window, thereby preventing the user from frequently triggering operations to hide and to display the second floating window.

In the embodiment, according to the left/right holding state in landscape orientation, the terminal displays the second floating window in the display area at the side of the non-holding hand, so that the user can the input text in the input method interface through the non-holding hand, thereby further improving the efficiency of text input.

In the embodiment, the user can split the input method interface into two parts by clicking the split button in the second floating window, and display them on the left and right display areas, it is convenient for the user to input text with both hands at the same time, thereby further improving the efficiency of text input in the floating windows.

Figure 18:
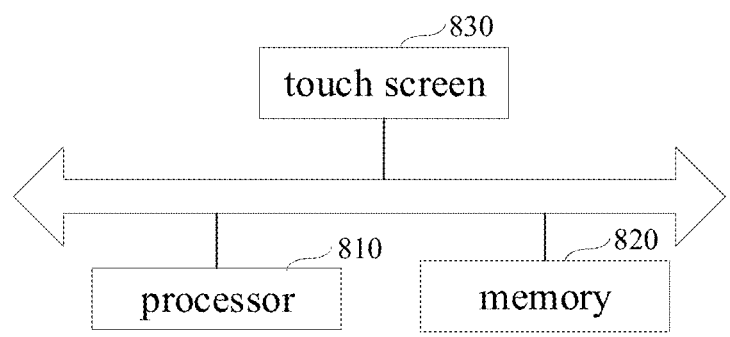
FIG. 18 is a structural block diagram of a terminal, according to an embodiment of the disclosure.

Please refer to FIG. 18, which shows a structural block diagram of a terminal according to an exemplary embodiment of the disclosure. The terminal includes a processor 801, a memory 802, and a touch display 803.

The processor 801 may be a central processing unit (CPU), a network processor (NP), or a combination of CPU and NP. The processor 801 may further include a hardware chip. The hardware chip may be an application-specific integrated circuit (ASIC), a programmable logic device (PLD), or a combination thereof. The PLD can be a complex programmable logic device (CPLD), a field programmable logic gate array (FPGA), a generic array logic (GAL), or any combination thereof.

The memory 802 is connected to the processor 801 through a bus or other manners. The memory 802 stores at least one instruction, at least one program, a set of codes, or a set of instructions. The at least one instruction, at least one program, a set of codes, or a set of instructions is/are loaded and executed by the processor 801, to perform the method for displaying an input method interface described in the above embodiments. The memory 802 may be a volatile memory, a non-volatile memory, or a combination thereof. The volatile memory can be a random access memory (RAM), such as static random access memory (SRAM), dynamic random access memory (DRAM). The non-volatile memory can be a read-only memory (ROM), such as programmable read-only memory (PROM), erasable programmable read-only memory (EPROM), electrically erasable programmable read-only memory (EEPROM). The non-volatile memory may also be a flash memory, a magnetic memory, such as magnetic tape, floppy disk, and hard disk. The non-volatile memory may also be an optical disc.

The touch screen 803 is connected to the processor 801 through a bus or other means. The memory 802 stores at least one instruction, and the at least one instruction is loaded and executed by the processor 801 to implement the method for displaying an input method interface as described in the foregoing embodiments.

An embodiment of the disclosure further provides a computer-readable medium. The computer-readable medium stores at least one instruction, and the at least one instruction is loaded and executed by a processor to implement the method for displaying an input method interface according to the foregoing embodiments.

An embodiment of the disclosure further provides a computer program product. The computer program product stores at least one instruction, and the at least one instruction is loaded and executed by a processor to implement the method for displaying an input method interface according to the foregoing embodiments.

Those skilled in the art should be aware that in one or more of the above examples, the functions described in the embodiments of the present disclosure may be implemented by hardware, software, firmware, or any combination thereof. When implemented in software, these functions may be stored in or transmitted over as one or more instructions or code on a computer-readable medium. Computer-readable media includes computer storage media and communication media including any medium that facilitates transfer of a computer program from one place to another. A storage media may be any available media that can be accessed by a general purpose or special purpose computer.

The above are only preferred embodiments of the present disclosure, and are not intended to limit the present disclosure. Any modification, equivalation, or improvement made within the spirit and principle of the present application shall be included in the protection of the present disclosure within range.

What is claimed is:

1. A method for displaying an input method interface, comprising:
   displaying a first user interface of a first application on a display screen of a terminal;
   displaying a first floating window on the first user interface, the first floating window being configured for displaying a second user interface of a second application; and
   moving the first floating window to be adjacent to a right border of the display screen, and displaying a second floating window on the first user interface at a left side of the first floating window, when receiving a text input operation signal from the second user interface and determining that the terminal is in landscape orientation, a display area at a left side of the first floating window is larger than a display area at a right side of the first floating window, and a size of the display area at the left side of the first floating window is less than a preset window size; or, moving the first floating window to be adjacent to a left border of the display screen, and displaying a second floating window on the first user interface at a right side of the first floating window, when receiving a text input operation signal from the second user interface and determining that the terminal is in landscape orientation, a display area at a left side of the first floating window is less than a display area at the right side of the first floating window, and a size of the display area at the right side of the first floating window is less than a preset window size;
wherein the first floating window and the second floating window are displayed concurrently on the first user interface and do not overlap with each other, and the second floating window is configured for displaying the input method interface.

2. The method as claimed in claim 1, wherein displaying the second floating window on the first user interface comprises:
superimposing and displaying the second floating window on the first user interface, wherein the first floating window and the second floating window do not overlap with each other.

3. The method as claimed in claim 2, wherein a portion of the first user interface is exposed.

4. The method as claimed in claim 2, wherein when receiving the text input operation signal from the second user interface, the method further comprises:
displaying the second floating window at the left side of the first floating window, when the terminal is in landscape orientation, and a display area at the left side of the first floating window is larger than a display area at the right side of the first floating window and larger than the preset window size; or
displaying the second floating window at the right side of the first floating window, when the terminal is in landscape orientation, and the display area at the right side of the first floating window is larger than the display area at the left side of the first floating window and larger than the preset window size.

5. The method as claimed in claim 1, wherein the first floating window and the second floating window are displayed on a top layer of the first user interface, the first floating window and the second floating window do not overlap with each other, and a portion of the first user interface is exposed.

6. The method as claimed in claim 1, wherein displaying the second floating window on the first user interface comprises:
when the terminal is in landscape orientation and is in the left-hand holding state, superimposing and displaying the second floating window on a display area at the right side of the first user interface, and superimposing and displaying the first floating window on a display area at the left side of the first user interface;
when the terminal is in landscape orientation and is in the right-hand holding state, superimposing and displaying the second floating window on the display area at the left side of the first user interface, and superimposing and displaying the first floating window on the display area at the right side of the first user interface.

7. The method as claimed in claim 1, wherein a split button is displayed in the second floating window in landscape orientation;
the method further comprises:
splitting the second floating window into a third floating window and a fourth floating window when an operation signal on the split button is received, wherein the third floating window and the fourth floating window are respectively configured for displaying a portion of the input method interface;
moving the first floating window to a central display region of the first user interface;

displaying the third floating window at the left side of the central display region, and displaying the fourth floating window at the right side of the central display region.

8. The method as claimed in claim 7, wherein the input method interface consists of a left half portion and a right half portion, the left half portion is displayed on the third floating window, and the right half portion is displayed on the fourth floating window.

9. The method as claimed in claim 1, wherein a first hidden button is displayed in the first floating window;
the method further comprises:
undisplaying the first floating window and the second floating window, when an operation signal on the first hidden button is received.

10. The method as claimed in claim 9, wherein a second hidden button is displayed in the second floating window;
the method further comprises:
undisplaying the second floating window, when an operation signal on the second hidden button is received.

11. The method as claimed in claim 1, after displaying the second floating window on the first user interface, the method further comprising:
setting the second floating window to be displayed with a first transparency when a window focus is at the second floating window;
setting the second floating window to be displayed with a second transparency when the window focus is at the first floating window, wherein the first transparency is smaller than the second transparency.

12. The method as claimed in claim 1, further comprising:
detecting the location of a window focus;
setting the first floating window to be displayed with a third transparency, when detecting that the window focus is located at the second floating window;
setting the first floating window to be displayed with a fourth transparency, when detecting that the window focus is at the first floating window, wherein the third transparency is larger than the fourth transparency.

13. The method as claimed in claim 1, further comprising:
displaying a move region in the second floating window;
receiving an operation signal from the move region;
changing, according to the received operation signal, the location of the second floating window displayed on the first user interface.

14. The method as claimed in claim 1, wherein the preset window size indicates a minimum window size capable of clearly displaying the input method interface;
wherein displaying a first user interface of a first application on a display screen of a terminal comprises:
displaying the first user interface of the first application on a main display area of the display screen of the terminal; and
wherein the method further comprises:
displaying a program icon of the second application on an auxiliary display area of the display screen of the terminal;
wherein the main display area is larger than and adjacent to the auxiliary area.

15. A terminal, comprising:
a processor and a memory, the memory storing at least one instruction, the at least one instruction being executed by the processor to implement a method for displaying an input method interface, comprising:
displaying a first user interface of a first application on a display screen of the terminal;

displaying a first floating window on the first user interface, the first floating window being configured for displaying a second user interface of a second application; and moving the first floating window to be adjacent to a right border of the display screen, and displaying a second floating window on the first user interface at a left side of the first floating window, when receiving a text input operation signal from the second user interface and determining that the terminal is in landscape orientation, a display area at a left side of the first floating window is larger than a display area at a right side of the first floating window, and a size of the display area at the left side of the first floating window is less than a preset window size; or, moving the first floating window to be adjacent to a left border of the display screen, and displaying a second floating window on the first user interface at a right side of the first floating window, when receiving a text input operation signal from the second user interface and determining that the terminal is in landscape orientation, a display area at a left side of the first floating window is less than a display area at the right side of the first floating window, and a size of the display area at the right side of the first floating window is less than a preset window size;

wherein the first floating window and the second floating window are displayed concurrently on the first user interface and do not overlap with each other, and the second floating window is configured for displaying the input method interface.

16. The terminal as claimed in claim 15, wherein displaying the second floating window on the first user interface comprises:

superimposing and displaying the second floating window on the first user interface, wherein the first floating window and the second floating window do not overlap with each other.

17. The terminal as claimed in claim 15, wherein a split button is displayed in the second floating window in landscape orientation;

the method further comprises:

splitting the second floating window into a third floating window and a fourth floating window when an operation signal on the split button is received, wherein the third floating window and the fourth floating window are respectively configured for displaying a portion of the input method interface;

moving the first floating window to a central display region of the first user interface;

displaying the third floating window at the left side of the central display region, and displaying the fourth floating window at the right side of the central display region.

18. The terminal as claimed in claim 15, wherein a first hidden button is displayed in the first floating window;

the method further comprises:

undisplaying the first floating window and the second floating window, when an operation signal on the first hidden button is received.

19. The terminal as claimed in claim 18, wherein a second hidden button is displayed in the second floating window;

the method further comprises:

undisplaying the second floating window, when an operation signal on the second hidden button is received.

20. The terminal as claimed in claim 15, further comprising:

detecting the location of a window focus;

setting the first floating window to be displayed with a third transparency, when detecting that the window focus is located at the second floating window;

setting the first floating window to be displayed with a fourth transparency, when detecting that the window focus is at the first floating window, wherein the third transparency is larger than the fourth transparency.

* * * * *